350-393
SR
XR 2,740,831
CROSS REFERENCE SEARCH ROOM

April 3, 1956 A. VARGA 2,740,831

COLOR TELEVISION SYSTEM

Filed Sept. 13, 1951 2 Sheets-Sheet 1

INVENTOR:
Andrew Varga,
BY Paul & Paul
ATTORNEYS.

2740831
OR IN 350/44

INVENTOR:
Andrew Varga,
BY Paul + Paul
ATTORNEYS.

United States Patent Office 2,740,831

Patented Apr. 3, 1956

2,740,831

COLOR TELEVISION SYSTEM

Andrew Varga, Philadelphia, Pa.

Application September 13, 1951, Serial No. 246,429

9 Claims. (Cl. 178—5.4)

This invention relates to a color television system and more particularly to apparatus and process for providing color television in a system which is compatible with present black and white receiving equipment.

In the field of color television there have been a number of systems which have been proposed. The principal systems comprise the CBS field-sequential system, the RCA dot-sequential system and the CTI line-sequential system. It has been found that there are disadvantages inherent in each of the above systems. The CBS system is substantially lacking in definition as compared to the standard black and white system and is incompatible with present black and white receivers which would not reproduce either in black and white or in color when tuned to a transmission operating under the CBS system. The RCA system overcomes the difficulty of lack of definition inherent in the CBS system but in so doing introduces complexities resulting in unduly high cost and difficulties such as color drift except when the system is in perfect adjustment. Moreover, the system at the receiving end requires either a three gun system or a tri-color tube, neither of which is currently present in a standard black and white receiver. The CTI line-sequential system likewise has the disadvantage of being highly complex and has a tendency to show line flicker or line crawl which can be eliminated only by making the system even more complex. As in the case of the RCA system, there is also required either a three gun system or a tri-color tube.

The principal object of the present invention is to provide a color television system which will be thoroughly compatible with existing equipment at the receiving end and at the same time utilize the standard cathode ray tube now employed in the standard black and white television receiver regardless of size and eliminate mechanically positioned color filters which become exceedingly bulky in receivers with large picture size.

A further object of the present invention is to provide a color television system which may employ a standard black and white receiver with the usual cathode ray tube without the necessity of any complex circuit changes and provide a means for electrically selecting the color sequence in synchronism with the transmitted signal.

A further object of the present invention is to provide an electrical means for sequentially filtering the color to be picked up by the iconoscope or camera tube at the television transmitter.

Means for attaining the above stated objects are shown in the accompanying drawings in which Fig. 1 consists of a block diagram representation of the receiver circuit used in carrying out the present invention in combination with a cathode ray tube and a color selector plate mounted in front of the tube.

Figure 1:
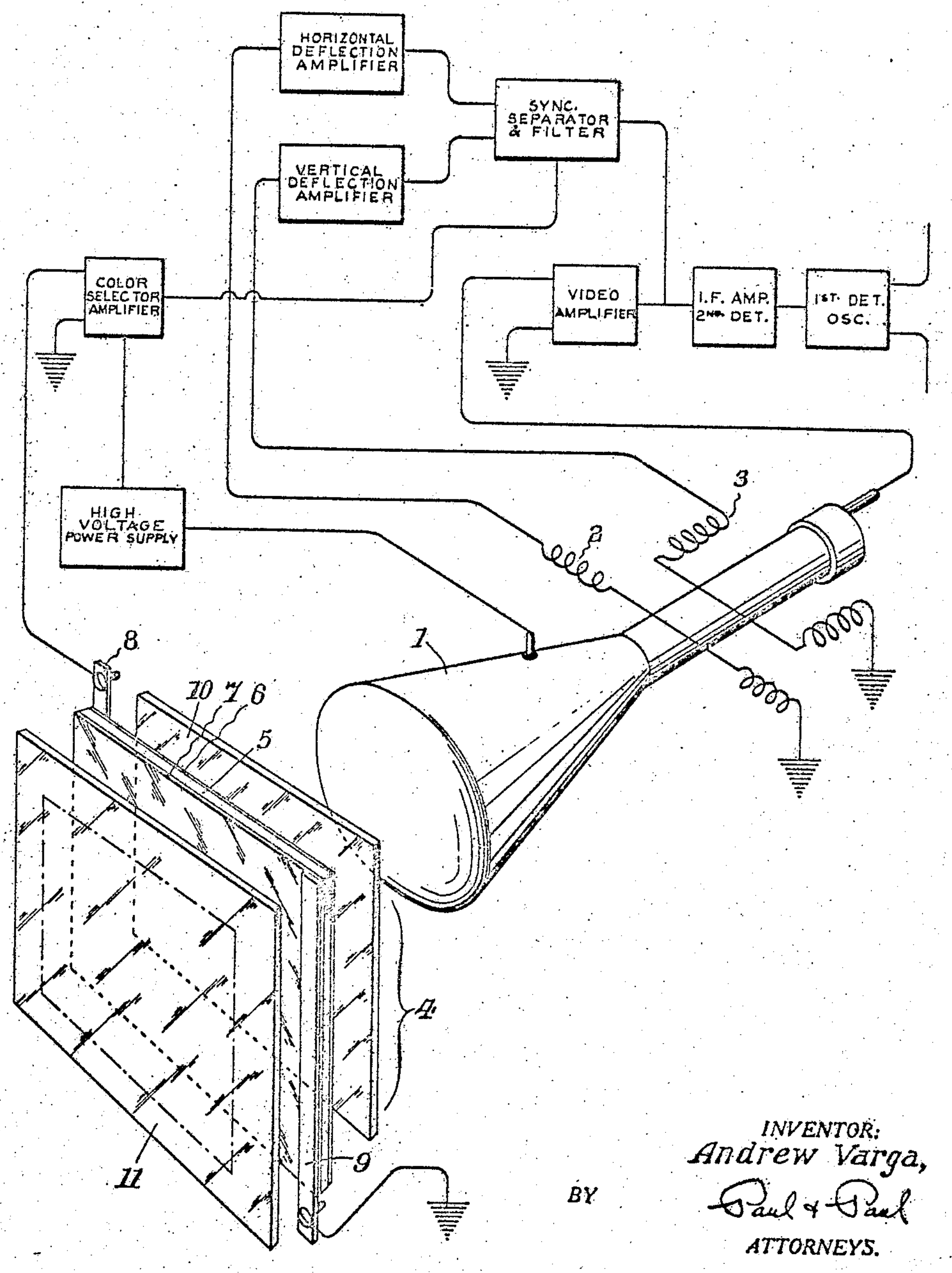
Figures 2, 3, 4, 5:
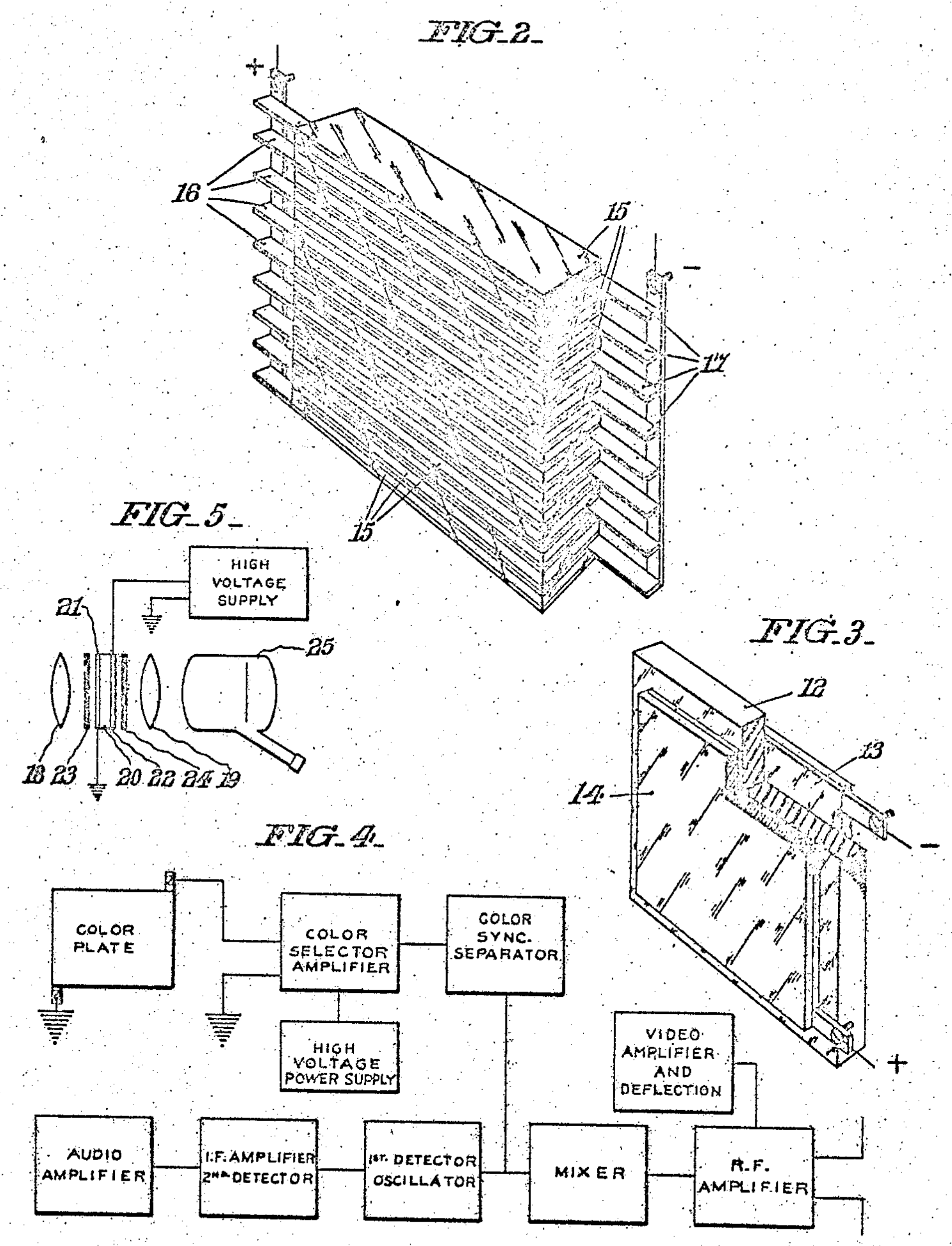
Figs. 2 and 3 show alternative forms of color selector plates.
Fig. 4 shows an alternative block diagram for the receiver.
Fig. 5 shows in diagrammatical form the combination of the present invention in conjunction with a television camera associated with the transmitting end of the television system.

As shown in the drawings the usual television receiver circuit is employed. In Fig. 1 the block diagram starts at the right hand side with the usual first detector and oscillator stage. It will be understood by those skilled in the art that the preceding stages will be the same as in standard television receivers and therefore these have not been shown. It should also be noted that the sync separator and filter is connected into the circuit in the standard way and that the output from the video amplifier is fed to the cathode ray tube 1 in the usual manner. The horizontal deflection and vertical deflection amplifiers respond to the horizontal and vertical sync pulses in the standard way and the output of these amplifiers is fed to the horizontal deflecting coils 2 and the vertical deflecting coils 3 as shown. In addition to the horizontal deflection amplifier and vertical amplifier there is provided what I have termed in this application a color selector amplifier which responds to color selector sync pulse which it receives from the sync separator and filter. The generation of this sync pulse at the transmitting end is described at a later point in this specification. The output from the color selector amplifier is fed to the color selector unit 4 which is made up of three component parts as shown in Fig. 1. The central portion of the color selector unit 4 consists of a transparent plate 5 having on each surface a very thin metallized conductive coating 6 and 7. The plate 5 itself is transparent and the thin films 6 and 7 which are practically integral with the plate 5 are also transparent. Plates of this nature, with coating on one side as shown in Fig. 3, are available commercially being similar to Pyrex brand E–C Radio Glass Panels manufactured and sold by the Corning Glass Works, Corning, New York, or a product known as NESA Coated Plate manufactured and sold by Pittsburgh Plate Glass Company, Pittsburgh, Pa. As shown in Fig. 1 the output from the color selector amplifier is electrically connected to coated surface 6 and 7 of the plate 5 by means of the contact strip 8 and the other coated surface is connected to ground by means of contact strip 9. The other elements of color selector unit 5 comprise the plates 10 and 11 which in Fig. 1 are shown in an exploded view. These plates consist of a transparent plastic polarizing material such as the product known as Polaroid which is manufactured and sold by the Polaroid Corporation, Cambridge, Mass. In actual operation the plates 5, 10 and 11 are brought closely together and firmly mounted in front of the viewing surface of the cathode ray tube 1.

It will be noted that the color selector amplifier is connected to the high voltage power supply. Consequently the voltage which is applied to the metallized coating 6 of plate 5 is a variable high voltage depending upon the particular sync pulse coming to the color selector amplifier from the sync separator and filter. This voltage is of the order of 5,000–8,000 volts and depends greatly upon the characteristics of the particular plate 5 which is employed in accordance with Kerr's formula $$E=\sqrt{\frac{n}{Kl}}$$

where $E$—Potential difference $n$—Change in wavelength $l$—is the length of path through the plate $K$—Kerr electro optic constant for material selected.

When voltages of this order are impressed upon plate 5 a difference of electrical potential is produced between the two surfaces of the plate 5 which produces an electrostatic stress in the material resulting in a double refraction effect or birefringence with respect to the passage of light which in this case will be coming from the cathode ray tube 1. The white light from cathode ray tube 1 is incident upon and passes through polarizer 10 and is plane polarized. The polarized light then passes through the metallized conductive coating 6 and is doubly refracted in plate 5 and passes through coating 7 and the analyzer 11 which is rotated at 90° to polarizer 10. The degree of stress and hence the color produced varies with the impressed voltage and these impressed voltages are selected to produce the colors red, blue and green when viewed through the polarizing plates 10 and 11. As shown in Fig. 1 the polarizing plate 10 operates as a polarizer and the plate 11 operates as an analyzer. The change in color occurs instantaneously on the change in the impressed voltage and consequently the problem of reproduction of a television picture in color reduces itself to applying the predetermined voltage to the plate 5 in the proper time sequence relative to the transmission of the video signal.

There are a number of known ways of transmitting the video signal in such a way as to successively transmit in the desired red, blue and green sequence. In the operation of the present system sync pulses are generated to correspond in time with the particular color being transmitted. Where these sync pulses are impressed on the video carrier they are incorporated in the same way as the horizontal and vertical deflection sync pulses and the color selector pulse transmitted is then separated out at the sync separator and filter as shown in Fig. 1. These color selector sync pulses may comprise three different pulses only one of which would be transmitted at a given time or a predetermined voltage corresponding to one of the colors may be used at the color selector plate as a standard no pulse voltage in which case only two sync pulses would be required to correspond with the other two of the remaining three colors. While the drawings of Figs. 1 and 4 show a connection to ground of one of the metallized surfaces, it will be understood that any arrangement whereby there is produced a substantial difference of potential as between the two metallized surfaces of the color selector plate will suffice provided the magnitude of the voltage difference is such as to produce a stress in the transparent metallized plate which will produce a double refraction corresponding to the desired color when ultimately viewed through the analyzer. This difference of potential may of course be produced either with one surface of the color selector plate at ground or above ground. The exact voltages for the particular colors will depend upon the composition of the plate on which the electrically conductive material is deposited. This plate should be transparent but may be either a borosilicate glass such as Pyrex glass No. 7740 as manufactured by Corning Glass Works or clear Bakelite or other synthetic resins. The color effect is produced by the doubly refracted polarized light as viewed through the analyzer element. Changes in color are produced by setting up different stresses which in turn have the effect of producing differences in the double refraction.

An alternative arrangement for the reception and use of sync pulses utilizing the audio carrier is shown in Fig. 4. In this embodiment of the invention the desired color selector sync pulses are impressed on the audio carrier at the transmitter by amplitude modulation and in this way interference with the usual frequency modulated audio signal is avoided. The sync pulse is then separated at the receiver just after the mixer as shown in Fig. 4, and fed to the color selector amplifier. In this embodiment of the invention the sync separator and filter for the horizontal and vertical deflection amplifiers will be separate from the sync separator for the color selector.

Alternative forms of the plate 5 are shown in Figs. 2 and 3. In the form shown in Fig. 3 this plate consists of a central plastic sheet 12 to which there is attached on each surface a metallized plate 13 and 14. Connections are provided to the metallized surface of the plates 13 and 14 as shown. In the form shown in Fig. 2 the central plate is made up of a plurality of metallized plates 15 with contact strips 16 and 17. The effect of this arrangement is to produce a stress in each of the plates 15 and the combined effect of these stresses viewed edgewise through an analyzer and polarizer provides the same color effect as in the case of the combination shown in Fig. 1.

The electrically operated color filter as described for receiving may also be used at the television camera, as represented simply in Fig. 5. In operation the television camera is directed to the scene being televised and light entering lens 18 passes through polarizer 23, through metallized coating 21 and isotropic material 20 and metallized coating 22 through analyzer 24 and lens 19 and finally impinge on photosensitive material in iconoscope 25. Lenses 18 and 19 represent simply the optical system with the electrically operated color filter composed of parts 20 to 24 interposed. As light from the scene passes through 23 it is plane polarized and in passing through material 20 it is rotated as a result of birefringence set up by electrostatic stress produced by difference in electrical potential on metallized coatings 21 and 22. The electrical potential applied is selected to produce birefringence of isotropic material 20 so that three values of potential will permit the passage of the red, green and blue components respectively of the incident light from the scene being televised. The voltages are sequentially applied and corresponding pulses are superimposed on the carrier to be separated at the receiving end as previously described.

Although the invention as described represents a method of color transmission and reception it is understood that a reforming of parts or the production of stresses by mechanical means does not constitute a departure from the spirit of the invention. The foregoing description uses the electro-optic properties of the electrostatically stressed material which are obtained with less complication that the photoelastic properties set up by more cumbersome mechanical devices.

It is further understood that manual adjustments are provided in the color selector amplifier for controlling the shading of each color.

I claim:

1. In a color television system the combination of a device having a surface on which an image is reproduced, means for providing said device with image producing signals, a color selector unit interposed in the external light path of said device comprising, in combination, a polarizer element, an analyzer element and a stress responsive element mounted between said polarizer and said analyzer elements said stress responsive element consisting of a material which is substantially transparent to light under no stress conditions but which when under stress subjects polarized light to double refraction on passing through said element thereby changing the color of said polarized light as viewed through an analyzer, electrically conductive layers in contact with the opposite surfaces of said stress responsive element, and means to apply successively a plurality of different stress producing voltages to one of said electrically conductive layers thereby causing said stress responsive element to doubly refract polarized light passing therethrough, the extent of double refraction being such that successive preselected colors are produced by said double refraction at the stress responsive element as viewed through the said analyzer.

2. A color television system including a device having a surface on which an image is reproduced, means for providing said device with a plurality of successive image producing signals representing predetermined color portions of subject matter being televised, a color selector unit interposed in the external light path of said image producing device comprising a light polarizing member, a stress responsive, double refracting element positioned in cooperative relationship with said light polarizing member, a light polarizing analyzer element positioned in cooperative relationship with said stress responsive element said stress responsive element consisting of a material which is substantially transparent to light under no stress conditions but which when under stress subjects polarized light to double refraction on passing through said element thereby changing the color of said polarized light as viewed through an analyzer, and means for applying successively a plurality of different voltages to said stress responsive element thereby causing said stress responsive element to doubly refract polarized light passing therethrough, the extent of double refraction being such that successive preselected colors are produced by said double refraction at the stress responsive element as viewed through the said analyzer.

3. The invention of claim 2 further characterized by the fact that said stress responsive means consists of a transparent plate having a thin electrically conductive coating in contact with the opposite face surfaces.

4. The invention of claim 2 further characterized by the fact that said stress responsive means consists of a glass plate having a thin metallized coating on its opposite face surfaces.

5. In a color television receiving system a cathode ray picture tube having a viewing surface, means to polarize light emerging from the external viewing surface of said picture tube stress responsive, color producing, means for subjecting said polarized light to double refraction, analyzer means positioned in the viewing path of the doubly refracted polarized light, means for applying successive different voltages to said double refraction means whereby successive color changes are produced at the stress responsive unit as viewed through the analyzer.

6. The invention of claim 5 further characterized by means for producing variations in said electrical potential in response to pulses synchronized with the time at which a particular color is being televised.

7. The invention of claim 2 further characterized by the fact that said stress responsive means consists of a plurality of transparent plates positioned one on top of the other, each plate having an electrically conductive metallized coating on the opposite face surface thereof.

8. The invention of claim 2 further characterized by the fact that said stress responsive means consists of a transparent plastic plate in combination with two transparent plates in contact with the opposite face surfaces thereof and having electrically conductive metallized surfaces on the faces disposed against the first mentioned transparent plate.

9. In a color television system a combination of a television transmitter including an optical system in which is interposed an electrostatically operated color filter consisting of polarizer, analyzer and a material whose electro-optic birefringence is determined by voltages applied thereto and a device at the receiving end of the system having a surface on which an image is reproduced, a color selector element interposed in the external light path of said device comprising in combination a polarizer, an analyzer and a stress responsive element, said stress responsive element consisting of a material which is substantially transparent to light under no stress conditions but which when under stress subjects polarized light to double refraction on passing through said element thereby changing the color of said polarized light as viewed through an analyzer, electrically conductive layers in contact with the opposite surface of said stress responsive element and means for applying successively a plurality of varying stress producing voltages to one of said electrically conductive layers thereby causing said stress responsive element to doubly refract polarized light passing therethrough, the extent of double refraction being such that successive preselected colors are produced by said double refraction at the stress responsive element as viewed through the said analyzer.

References Cited in the file of this patent

UNITED STATES PATENTS

| | | |
|---|---|---|
| 2,109,540 | Leishman | Mar. 1, 1938 |
| 2,493,200 | Land | Jan. 3, 1950 |
| 2,586,635 | Fernsler | Feb. 19, 1952 |
| 2,676,962 | Jaffe | Nov. 4, 1952 |